C. G. FRENCH.
Dental Forceps.

No. 145,058.

Patented Dec. 2, 1873.

Witnesses,
Henry C. Latham.
James R. Rowan.

Inventor,
Cyrus G. French

UNITED STATES PATENT OFFICE.

CYRUS G. FRENCH, OF SPRINGFIELD, ILLINOIS.

IMPROVEMENT IN DENTAL FORCEPS.

Specification forming part of Letters Patent No. 145,058, dated December 2, 1873; application filed October 22, 1873.

*To all whom it may concern:*

Be it known that I, CYRUS G. FRENCH, of Springfield, Sangamon county, Illinois, have invented a Dental Forceps, of which the following is a specification:

This invention relates to that kind of dental forceps most especially intended for the extraction of roots of teeth so frail or wasted, by decay or otherwise, that they cannot be well extracted with ordinary instruments used for that purpose without injury to the gum or alveolar bone.

To explain the manner and mode of constructing my forceps, I refer to the accompanying drawings.

Figure 1:
Figure 2:
Figure 3:
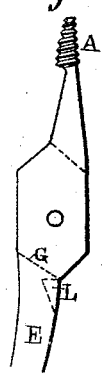
Figure 4:
Figure 5:
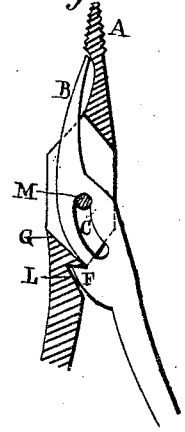

They are novel in that one of the beaks A, Figure 1, has on its point a conical screw. The other beak is similar to those of common root-forceps used by dentists generally. The joint-connection of the two parts or sections of the forceps is also novel, in that a knuckle or cam, acting as a fulcrum, F, Fig. 2, is made on the joint part of that section having the common beak, D, in such position and shape that the cam or fulcrum F, in closing the forceps, slides forward upon the inclined plane G, Fig. 4, of the back part of the joint-mortise in the other section of the forceps E. To allow this movement a slot, C, (instead of a pin or screw hole,) Fig. 2, is made in the joint part of section D, of such length and shape as to permit either section to move forward or backward to open and close. Section E has also a recess or notch formed in it, L, immediately behind the joint-mortise, in which the cam or fulcrum closes, Fig. 5, when the section D is drawn back for the purpose of inserting the screw into the root, as hereinafter described.

Figure 6:
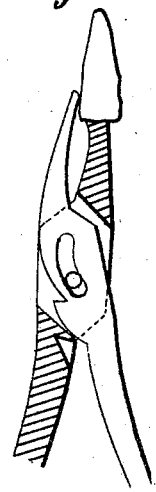

To extract the root of a tooth with my forceps, the nerve or dental canal is enlarged (if necessary) with a proper-sized drill. The plain beak on section D is drawn back, the cam resting in the notch, as in Fig. 5. Being held in this position, the screw is inserted into the hole made in the root. Then the other section D is opened and the beak moved forward onto the margin of the root, as in Fig. 6. The handles now being pressed as if to take hold, the plain beak is driven forward, by the sliding of the cam F on the inclined plane G (the back of the mortise) along the root, toward the apex of the root, until it comes in contact with the alveolar bone, when, stopping, the section having the conical screw is forced back by the fulcrum, carrying with it the root on the conical screw, as in Fig. 6; but should the plain beak not meet with bone sufficient to stop its moving, it will reach a position so near the point of the root that it can be removed with little force by the operator. The whole arrangement is such that there is a tendency of the instrument to seize a deeper and better hold upon the tooth in the operation of extracting, instead (as is the case with common forceps) of slipping from off the tooth.

I do not claim having invented a conical screw, for it has been used by dentists; but What I do claim, and desire to secure by Letters Patent, is—

The above-described dental forceps, having a conical screw on the end of one of the beaks, a cam acting as a fulcrum in the joint, a slot in which the pin or screw is put to connect the two parts of the forceps, and the recess or notch behind the joint for the cam to rest in, as substantially shown and described.

CYRUS G. FRENCH.

Witnesses:
HENRY C. LATHAM,
JAMES R. ROWAN.